(12) United States Patent
Sheng

(10) Patent No.: US 9,391,477 B2
(45) Date of Patent: Jul. 12, 2016

(54) WIRELESS POWER TRANSMITTING DEVICE HAVING POSITION DETECTING FUNCTION

(71) Applicant: TOKO, INC., Tsurugashima-shi, Saitama-ken (JP)

(72) Inventor: Jianxin Sheng, Tsurugashima (JP)

(73) Assignee: TOKO, INC., Tsurugashima-shi, Saitama-ken (JP)

( * ) Notice: Subject to any disclaimer, the term of this patent is extended or adjusted under 35 U.S.C. 154(b) by 672 days.

(21) Appl. No.: 13/762,474

(22) Filed: Feb. 8, 2013

(65) Prior Publication Data
US 2013/0207480 A1 Aug. 15, 2013

(30) Foreign Application Priority Data

Feb. 10, 2012 (JP) ................................. 2012-026936
Sep. 14, 2012 (JP) ................................. 2012-202405

(51) Int. Cl.
*H02J 5/00* (2016.01)
*H04B 5/00* (2006.01)
*H02J 17/00* (2006.01)

(52) U.S. Cl.
CPC *H02J 17/00* (2013.01); *H02J 5/005* (2013.01)

(58) Field of Classification Search
CPC ........... H02J 5/005; H02J 7/025; H02J 17/00; H04B 5/0037; H01F 38/14; A61N 1/37223; A61N 1/3787
USPC ......................................................... 307/104
See application file for complete search history.

(56) References Cited

U.S. PATENT DOCUMENTS 3,882,374 A * 5/1975 McDaniel ............... G01V 3/107
                                                   324/243
2011/0004278 A1 * 1/2011 Aghassian ........... A61N 1/3787
                                                   607/61

(Continued)

FOREIGN PATENT DOCUMENTS

CN       101809842 A     8/2010
JP        2010-263663     11/2010

(Continued)

OTHER PUBLICATIONS

Chinese Office Action with English Translation (Application No. 201310049885.X) (14 pages—dated Nov. 6, 2015.
Japanese Office Action with English Translation (Application No. 2012-202405) (8 pages—dated Mar. 3, 2016).

*Primary Examiner* — Kenneth B Wells
*Assistant Examiner* — James P Evans
(74) *Attorney, Agent, or Firm* — Renner, Kenner, Greive, Bobak, Taylor & Weber

(57) ABSTRACT

There is provided a wireless power transmitting device which can detect relative positions of a power transmitting coil and a power receiving coil with a simple configuration, and reduce cost of components. The wireless power transmitting device has: a power transmitting coil which supplies power to a power receiving coil by way of electromagnetic induction; an excitation coil which excites the power receiving coil; a plurality of detecting coils which are arranged around a center of the power transmitting coil; and notifying units, and each of the detecting coils has a shape which widens apart from the center of the power transmitting coil, and the notifying units notify relative positions of the power transmitting coil and the power receiving coil by detecting an echo signal produced in the power receiving coil through the plurality of detecting coils.

12 Claims, 4 Drawing Sheets

(56) References Cited

U.S. PATENT DOCUMENTS

2011/0093048 A1* 4/2011 Aghassian ............ A61N 1/3787
607/61
2013/0024059 A1* 1/2013 Miller .................... H01F 38/14
701/22

FOREIGN PATENT DOCUMENTS

| JP | 2010-273472 A | 12/2010 |
|----|---------------|---------|
| WO | WO 01/95432 A1 | 12/2001 |
| WO | WO 2011/005696 A1 | 1/2011 |

* cited by examiner

WIRELESS POWER TRANSMITTING DEVICE HAVING POSITION DETECTING FUNCTION

BACKGROUND OF THE INVENTION

1. Field of the Invention

The present invention relates to a wireless power transmitting device.

2. Related Art

Recently, wireless power transmitting devices of an electromagnetic induction type for mobile devices are spreading. Power is wirelessly transmitted to a power receiving coil built in a power receiver such as an electronic device through an alternate current magnetic field produced by a power transmitting coil built in the wireless power transmitting device. The power transmitted to the power receiving coil is supplied to a load such as a secondary battery through a rectifying circuit. The secondary battery in the power receiver can be charged conveniently by just placing the power receiver on the wireless power transmitting device, and a power connector does not need to be inserted and removed, so that there is an advantage that a waterproof function and a dust-proof function can be added to the power receiver.

Wireless power transmitting devices are demanded to improve efficiency of power transmission from power transmitting coils to power receiving coils. Hence, it is necessary to accurately align a position of a power receiving coil to a position of a power transmitting coil. As one of these means for realizing this alignment, there is a method of detecting a position of the power receiving coil and moving a power transmitting coil close to the power receiving coil by means of a moving mechanism provided in a wireless power transmitting device (see, for example, Japanese Patent Application Laid-Open No. 2010-263663).

SUMMARY OF THE INVENTION

However, when such an aligning method is used, a mechanism element such as a motor is required as a moving mechanism. Hence, a configuration becomes complicated and increases cost and, moreover, a complex algorithm for detecting a position of a power receiving coil is also required.

The present invention is made taking such a problem into account, and an object of the present invention is to provide a wireless power transmitting device, which detects relative positions of a power transmitting coil and a power receiving coil with a simple configuration, and reduce cost of components for constituting the device.

In order to achieve such an object of the present invention, the wireless power transmitting device has: a power transmitting coil which supplies power to a power receiving coil by way of electromagnetic induction; an excitation coil which excites the power receiving coil; a plurality of detecting coils which are arranged around a center of the power transmitting coil; and a notifying unit, and each of the detecting coils has a shape which widens apart from the center of the transmitting power coil, and the notifying unit notifies relative positions of the power transmitting coil and the power receiving coil by detecting an echo signal produced in the power receiving coil through the plurality of detecting coils.

The wireless power transmitting device according to the present invention can detect relative positions of a power transmitting coil and a power receiving coil with a simple configuration, and reduce cost of components for constituting the device.

DETAILED DESCRIPTION OF THE INVENTION

Embodiments of the present invention will be described below.

First Embodiment

Figure 1:
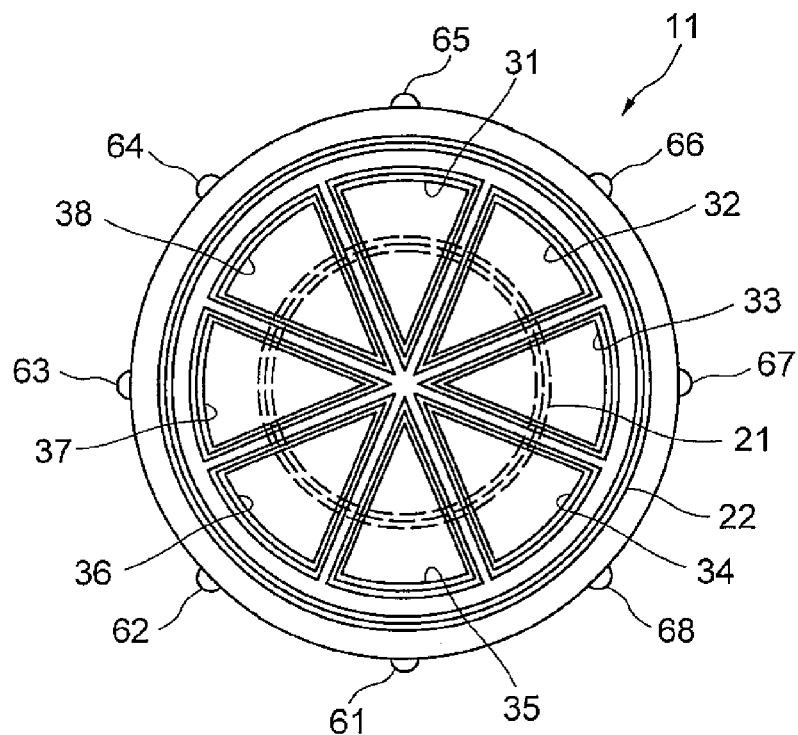
FIG. 1 is a wireless power transmitting device according to a first embodiment of the present invention.

FIG. 1 is a wireless power transmitting device according to a first embodiment of the present invention. A wireless power transmitting device 11 has a power transmitting coil 21, an excitation coil 22 and detecting coils 31 to 38 which are built in the wireless power transmitting device 11, and directional guidance LEDs 61 to 68 which are arranged in the outer periphery of the wireless power transmitting device 11. FIG. 1 illustrates a positional relationship between each coil and LED when the wireless power transmitting device 11 is seen from above.

The power transmitting coil 21 and the excitation coil 22 are arranged such that the centers of the power transmitting coil 21 and the excitation coil 22 virtually match. Further, a plurality of fan-shaped detecting coils 31 to 38 surround the center of the power transmitting coil 21, and are arranged symmetrically around the center of the power transmitting coil 21. Each of the detecting coils 31 to 38 has a planar shape and adopts a thin structure, and is arranged on the same plane. The excitation coil 22 is arranged outside the detecting coils 31 to 38. The LEDs 61 to 68 are arranged oriented from the center of the power transmitting coil 21 toward the outer periphery direction of the detecting coils 31 to 38, and emit light toward an outside of the wireless power transmitting device 11.

Figure 2:
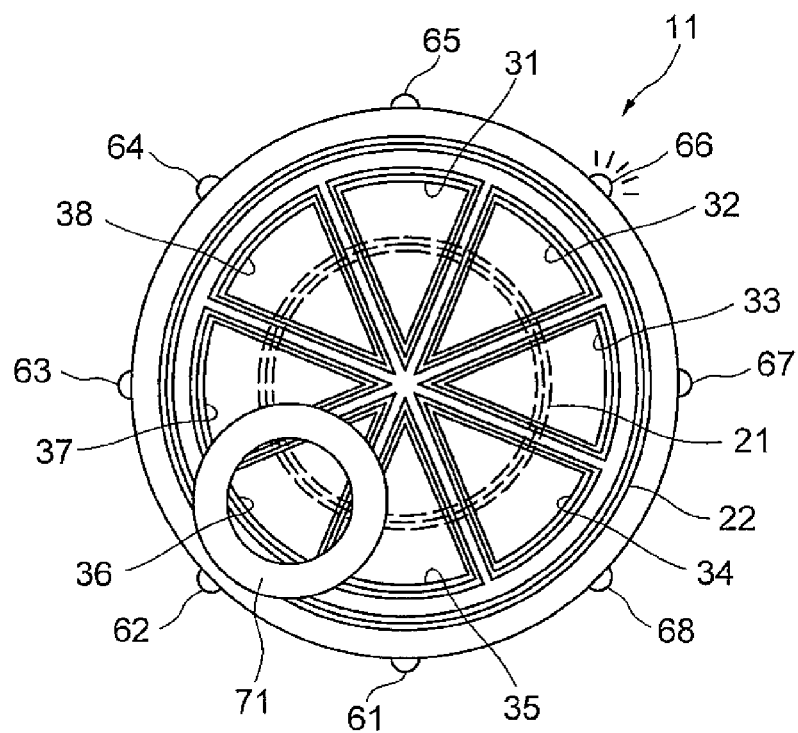
FIG. 2 is a view illustrating an example of a state where a power receiving coil is placed on the wireless power transmitting device according to the first embodiment of the present invention.

FIG. 2 is a view illustrating an example of a state where a power receiver such as a mobile device having the built-in power receiving coil 71 is placed on the wireless power transmitting device 11 according to the first embodiment of the present invention. When the power receiving coil 71 is excited by the excitation coil 22, an alternate current magnetic field is produced in the power receiving coil 71. This alternate current magnetic field is referred to as an "echo signal", and the relative position of the power receiving coil 71 with respect to the power transmitting coil 21 is detected based on this echo signal, and a detection result is notified to a user using the LEDs 61 to 68.

A method of detecting the relative positions of the power transmitting coil 21 and the power receiving coil 71 will be described in detail. First, the excitation coil 22 is applied a pulse signal from, for example, a pulse power source. The excitation coil 22 and the power receiving coil 71 are magnetically coupled, so that a current is induced by the power receiving coil 71. Further, an echo signal produced in the power receiving coil 71 by this current is detected by each of the detecting coils 31 to 38. The intensity of a signal detected by each of the detecting coils 31 to 38 is sequentially selected and read by a control unit such as a microcontroller using a switch such as a multiplexer. Further, a maximum value and a minimum value among detection signals are calculated, and a detecting coil which detects the maximum value is specified.

Basically, the maximum value of the detection signal can be obtained from a detecting coil which has a largest area overlapping the power receiving coil 71. Each of the detecting coils 31 to 38 is arranged to surround the center of the power transmitting coil 21, and, by finding the position of the detecting coil which detects the maximum value of the detection signal, it is possible to know the direction of the power receiving coil 71 from the center of the power transmitting coil 21. For example, in a state illustrated in FIG. 2, the detecting coil which has the largest area overlapping the power receiving coil 71 is the detecting coil 36. Hence, the detection signal detected from the detecting coil 36 is the maximum value. Further, the LED 66 is lighted which is arranged in the opposite direction of the detecting coil 36 which detects the detection signal of the maximum value, based on the center of the power transmitting coil 21. Thus, the relative position of the power transmitting coil 21 with respect to the power receiving coil 71 is notified to the user. That is, the center of the power transmitting coil is positioned between the power receiving coil 71 and the lighted LED, so that, by moving the power receiver having the built-in the power receiving coil 71 toward the direction of the lighted LED 66, the user can place the center of the power receiving coil 71 close to the center of the power transmitting coil 21.

When the detection signal detected by the detecting coil 31 takes the maximum value, the LED 61 in the opposite direction of the detecting coil 31 based on the center of the power transmitting coil 21 is lighted and, similarly, when a detection signal detected by another detecting coil takes a maximum value, an LED in the opposite direction of this detecting coil based on the center of the power transmitting coil 21 is lighted. Thus, by lighting an LED in the opposite direction of the detecting coil which detects the detection signal of the maximum value, it is possible to notify a misalignment direction of the power receiving coil. Each of the detecting coils 31 to 38 is arranged to surround the center of the power transmitting coil 21, so that, even when there is the power receiving coil 71 at any position on the wireless power transmitting device 11, it is possible to detect the position. It is only necessary to light an LED located in opposite side from a detecting coil which detects a maximum detection signal, and it is possible to calculate a misalignment direction according to a very simple algorithm.

When the center of the power receiving coil 71 is placed close to the center of the power transmitting coil 21, respective overlapping areas of the detecting coils 31 to 38 and the power receiving coil 71 gradually become equal. That is, differences between detection signals detected by the detecting coils 31 to 38 become small, and the ratio of the maximum value and the minimum value of the detection signals becomes close to 1. When this ratio becomes a given threshold or less, that is, when, for example, maximum value of each detection/minimum value of each detection <1.2 is true, the centers of the power transmitting coil 21 and the power receiving coil 71 virtually match. That is, it is possible to regard that the power receiving coil 71 comes into an active area for efficiently transmitting power. By this means, it is possible to efficiently transmit power from the power transmitting coil 21 to the power receiving coil 71. Further, that the position of the power receiving coil 71 is in an active area is notified to the user by lighting or flashing all LEDs 61 to 68 or changing emission colors.

A notice of the misalignment direction is repeated at a predetermined cycle until alignment of the power receiving coil 71 is finished. When it is regarded that alignment is finished, in the next step, an ID is authenticated between the wireless power transmitting device 11 and the power receiver, and, when the ID is authenticated, the wireless power transmitting device 11 enters a power transmitting mode of transmitting power from the power transmitting coil 21 to the power receiving coil 71.

Thus, each of the detecting coils 31 to 38 is arranged to surround the center of the power transmitting coil 21, and has a shape which widens apart from the center of the power transmitting coil 21. By forming such a shape, it is possible to improve precision of directional guidance even when the power receiving coil 71 is placed at any position on the wireless power transmitting device 11. Particularly, by forming a virtually fan shape by dividing by eight a concentric circle, the center of which is the center of the power transmitting coil 21 based on the center of the power transmitting coil 21, it is possible to improve sensitivity of detecting an echo signal without forming a gap between adjacent detecting coils. Further, each of the detecting coils 31 to 38 is arranged symmetrically with respect to a point of the center of the power transmitting coil 21, so that it is possible to further improve precision of directional guidance. The shape of each of the detecting coils 31 to 38 preferably widens in a radial pattern from the center of the power transmitting coil 21.

Adjacent detecting coils preferably have fan shapes which allow adjacent detecting coils to be arranged close to each other such that gaps therebetween are narrow. As long as a plurality of adjacent detecting coils can be arranged to close to each other, the shape of each of the detecting coils 31 to 38 may have a shape other than a fan shape. For example, an arc portion of each of detecting coils 31 to 38 may be linear, or two lines connecting both ends of the arc may be curved. Further, the number of detecting coils is not limited to eight, and may be even or odd. When the number of misalignment directions of the power receiving coil is five, the numbers of detecting coils and LEDs only need to be five. Each of the detecting coils 31 to 38 preferably has a shape which enables an arrangement of point symmetry, line symmetry or rotational symmetry with respect to the center of the power transmitting coil 21. For example, each detecting coil only needs to have a shape obtained by equally dividing a circle by the number of directions in which directional guidance needs to be performed, based on the center of the power transmitting coil 21.

Thus, the misalignment direction of the power transmitting coil 21 with respect to the power receiving coil 71 is notified to the user and then the user moves the position, so that a moving mechanism such as a motor is not necessary. Consequently, it is possible to simplify a configuration and reduce cost. Further, the LEDs 61 to 68 are arranged in the outer periphery direction of a plurality of detecting coils 31 to 38 based on the center of the power transmitting coil 21, so that, even when the power receiver is placed near the center of the wireless power transmitting device 11, lights from the LEDs 61 to 68 are not blocked by the power receiver.

In addition, although LEDs are used as units which notify a misalignment direction of the power receiving coil, other light emitting elements may be used. Further, a method of notifying a misalignment direction by means of sound or providing a display and displaying a misalignment direction may be used. Furthermore, LEDs may be flashed without being lighted or colors may be changed. A unit which notifies an end of alignment may use a method such as not only flashing of LEDs but also sound, vibration and display using a display.

Although the excitation coil 22 to which a pulse signal is applied is used to excite the power receiving coil 71, the detecting coils 31 to 38 may also function as excitation coils. For example, a pulse signal is applied to the detecting coil 31, and an echo signal excited by the power receiving coil 71 is detected by the detecting coil 31. Next, a pulse signal is applied to the detecting coil 32 and the excited echo signal is detected from the power receiving coil 71 by the detecting coil 32, that is, an echo signal can be sequentially extracted from each of the detecting coils 31 to 38.

In addition, although a plurality of detecting coils 31 to are arranged to surround the center of the power transmitting coil 21 in the present embodiment, for example, only misalignment in the single direction may also be detected by adopting a structure using only the detecting coil 31 and the detecting coil 35. That is, an arbitrary detecting coil of a plurality of detecting coils may be used.

Second Embodiment

Figure 3:
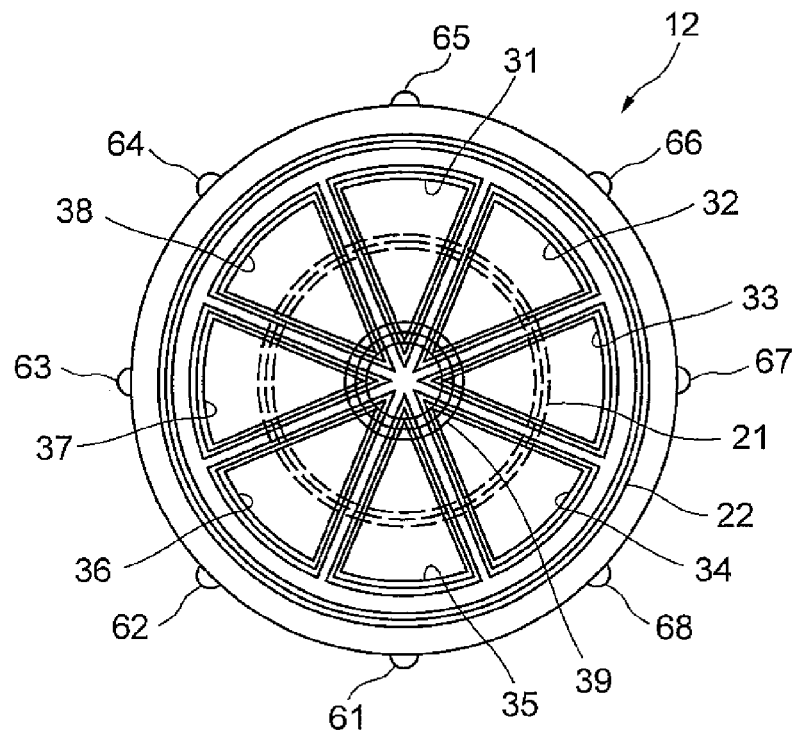
FIG. 3 illustrates a wireless power transmitting device according to a second embodiment of the present invention.

Next, FIG. 3 illustrates a wireless power transmitting device according to a second embodiment of the present invention. In addition, parts having the same functions as those of the above embodiment will be assigned the same reference numerals, and will not be described. A wireless power transmitting device 12 further has a planar, thin and virtually circular detecting coil 39 (second detecting coil) inside a plurality of detecting coils 31 to 38 (first detecting coils).

A power transmitting coil 21 and the second detecting coil 39 are arranged such that centers of the power transmitting coil 21 and the second detecting coil 39 virtually match. The second detecting coil 39 is arranged to partially overlap the first detecting coils 31 to 38. Similar to the first detecting coils 31 to 38, when a pulse signal is applied to an excitation coil 22, the second detecting coil 39 also detects an echo signal produced from a power receiving coil 71.

A method of detecting relative positions of the power transmitting coil 21 and the power receiving coil 71 is the same as that of the first embodiment. Basically, similar to the first embodiment, only detection signals detected by the first detecting coils 31 to 38 are used to decide whether or not positions of the power transmitting and receiving coils virtually match. However, in the second embodiment, when the decision does not work well, a detection signal detected by the second detecting coil 39 is also used.

A wireless power transmitting device which is used for a general purpose needs to support various power receivers which have different diameters of power receiving coils and different characteristics. Hence, when the same pulse signal is applied to the excitation coil 22, some echo signals excited by the power receiving coil are strong and some are weak. When the power receiving coil comes close to the center of the power transmitting coil 21, an overlapping area of the fan-shaped first detecting coils 31 to 38 and the power receiving coil gradually becomes small. Hence, the detection signals detected by the first detecting coils 31 to 38 also become gradually weak. When, for example, the diameter of the power receiving coil is smaller than that of the power transmitting coil 21, a power receiver, in which an echo signal produced in the power receiving coil is originally weak, has difficulty in detecting echo signals through the first detecting coils 31 to 38. Then, it is possible to solve such a problem by providing the small second detecting coil 39 which is concentric with the power transmitting coil 21 in addition to the eight first detecting coils 31 to 38. By this means, even when the first detecting coils 31 to 38 cannot perfectly detect echo signals, if the second detecting coil 39 in the center can detect the echo signal, it is possible to regard that the positions of the power transmitting and receiving coils virtually match and decide that alignment of the power transmitting coil 21 and the power receiving coil is finished. Further, that the relative positions of the power transmitting and receiving coils are in an active area is notified to the user by lighting or flashing all LEDs 61 to 68 or changing emission colors.

Thus, by arranging the second detecting coil 39 concentrically with the power transmitting coil 21 and using the detection signals detected by the first detecting coils 31 to 38 and the second detecting coil 39 in combination, whether or not the relative positions of the power transmitting and receiving coils virtually match is decided. By this means, it is possible to support various power receivers having different diameters and characteristics of power receiving coils, and improve versatility of the wireless power transmitting device 12. In addition, the second detecting coil 39 may have another shape such as an octagonal shape in addition to a circular shape.

In addition, the first detecting coils 31 to 38 can also be configured to detect only misalignment in the single direction by, for example, adopting a structure using only the first detecting coil 31 and the first detecting coil 35. That is, an arbitrary first detecting coil may be used from a plurality of detecting coils around the center of the power transmitting coil 21.

Third Embodiment

Figure 4:
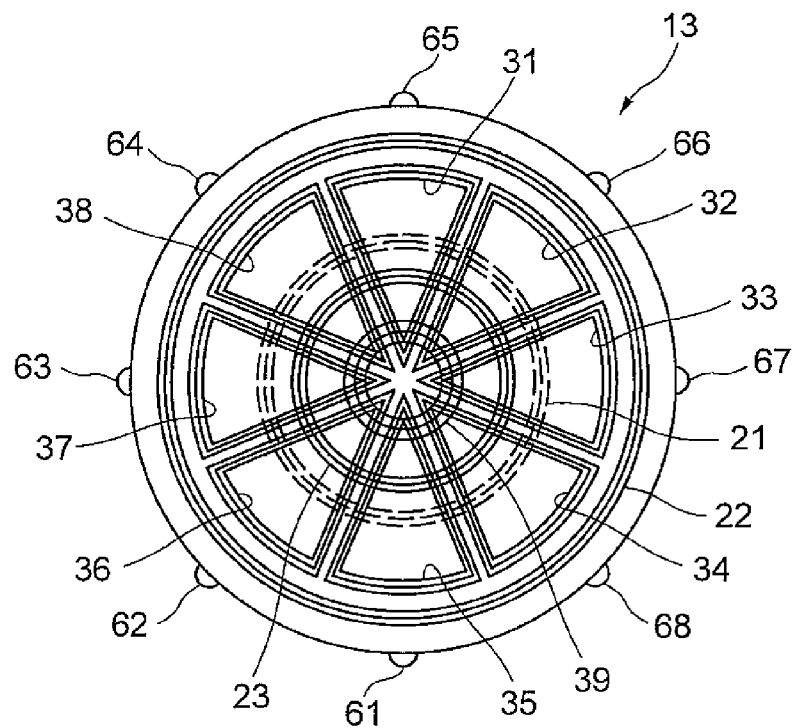
FIG. 4 illustrates a wireless power transmitting device according to a third embodiment of the present invention.

Next, FIG. 4 illustrates a wireless power transmitting device according to a third embodiment of the present invention. In addition, parts having the same functions as those of the above embodiment will be assigned the same reference numerals, and will not be described. A wireless power transmitting device 13 further has a second excitation coil 23 which is arranged concentrically with a first excitation coil 22 and which has the virtually same diameter as a power receiving coil.

As illustrated in FIG. 4, the second excitation coil 23 is arranged on an inner side of the first excitation coil 22 and is arranged such that centers of a power transmitting coil 21 and the excitation coils 22 and 23 virtually match. The second excitation coil 23 is applied a pulse signal from a pulse power source similar to the first excitation coil 22.

Figure 5:
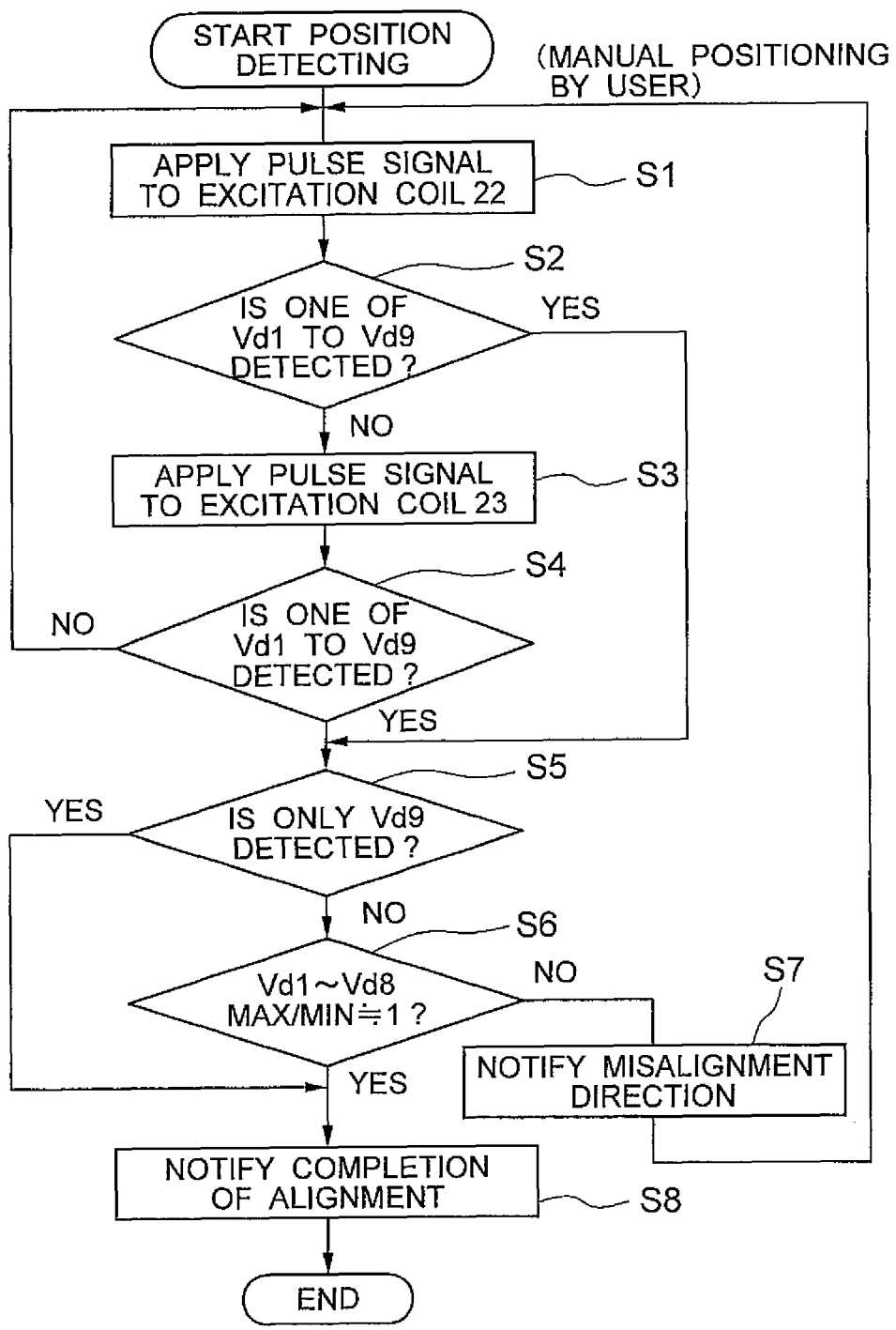
FIG. 5 illustrates a flowchart of a position detecting method of the wireless power transmitting device according to the third embodiment of the present invention.

FIG. 5 illustrates a flowchart of a position detecting method of the wireless power transmitting device according to the third embodiment of the present invention. A method of detecting relative positions of the power transmitting coil and the power receiving coil will be described with reference to the flowchart illustrated in FIG. 5. Meanwhile, detection signals detected by first detecting coils 31 to 38 are Vd1 to Vd8, and a detection signal detected by the second detecting coil 39 is Vd9.

First, only the first excitation coil 22 is applied a pulse signal from the pulse power source (step S1).

Further, the first and second detecting coils 31 to 39 decide whether or not the detection signals Vd1 to Vd9 are detected (step S2).

When none of the detection signals Vd1 to Vd9 is detected, connection of the pulse power source is switched to the second excitation coil 23, and a pulse signal is applied only to the second excitation coil 23 (step S3).

Further, the detecting coils 31 to 39 decide whether or not the detection signals Vd1 to Vd9 are detected. When none of the detection signals Vd1 to Vd9 is detected, the flow returns to above step S1 (step S4).

In step S2 or step S4, when one of the detection signals Vd1 to Vd9 is detected, whether or not only the detection signal Vd9 is detected is decided (step S5). In step S5, when the condition that only the detection signal Vd9 is detected is not true, that is, when at least one of the detection signals Vd1 to Vd8 is detected, a maximum value and a minimum value of the detection signals Vd1 to Vd8 are calculated, and a ratio of the maximum value and the minimum value is calculated (step S6).

In step S6, when the ratio of the maximum value and the minimum value is not close to one, a misalignment direction between the power transmitting and receiving coils is notified. More specifically, an LED which is arranged in a direction opposite to the first detecting coil which detects the detection signal of the maximum value is lighted or flashed (step S7).

In step S5, when only the detection signal Vd9 is detected, it can be regarded that the diameter of the power receiving coil is smaller than that of the power transmitting coil 21 and the center positions of the power receiving coil and the power transmitting coil 21 virtually match, so that completion of alignment is notified. More specifically, all LEDs 61 to 68 are lighted or flashed, or emission colors are changed. In step S6, when the ratio of the maximum value and the minimum value of the detection signals Vd1 to Vd8 is close to one, completion of alignment is notified likewise (step S8).

When it is regarded that alignment is finished, in the next step, an ID is authenticated between the wireless power transmitting device 13 and a power receiver and, when the ID is authenticated, the wireless power transmitting device 13 enters a power transmitting mode of transmitting power from the power transmitting coil 21 to the power receiving coil.

In the present embodiment, two excitation coils which excite the power receiving coil are arranged concentrically. The second excitation coil 23 is provided to play an auxiliary role of the first excitation coil 22 which is mainly driven. That is, even when the first excitation coil 22 is driven, if an echo signal cannot be detected, the second excitation coil 23 is driven. By this means, it is possible to decide whether or not the power receiver is not placed on the wireless power transmitting device 13 or whether or not the power receiving coil is near the center of the power transmitting coil.

As described above, a detection signal detected by each first detecting coil depends on sizes and characteristics of the first detecting coils and the power receiving coil and a coupling coefficient of the power receiving coil and the excitation coil. Although the first excitation coil 22 is preferably arranged outside the first detecting coils 31 to 38 to expand a detection area, a difference between the diameters of the power receiving coil and the first excitation coil 22 becomes significant, and therefore the coupling coefficient of the power receiving coil and the first excitation coil 22 becomes small and an echo signal excited by the power receiving coil becomes relatively weak. By contrast with this, if the excitation coil is made small to improve coupling of the power receiving coil and the first excitation coil 22, a range for detecting the power receiving coil becomes narrow.

In the present embodiment, by concentrically arranging a plurality of excitation coils of different diameters and switching and using the excitation coils when necessary, it is possible to enable both of expansion of the detection area of the power receiving coil and improvement of detection sensitivity of the echo signal. That is, when the power receiving coil is near the center of the power transmitting coil 21, an overlapping area of the first detecting coils 31 to 38 used for directional guidance becomes small, so that it is possible to strengthen an echo signal from the power receiving coil by exciting the power receiving coil by means of the second excitation coil 23 having a high coupling coefficient with the power receiving coil. By this means, it is possible to realize more precise directional guidance upon notification of a misalignment direction. In addition, the embodiment can be implemented in combination with the other embodiments in this description.

In addition, a plurality of first detecting coils 31 to 38 can also be configured to detect only misalignment in a single direction by, for example, adopting a structure using only the first detecting coil 31 and the first detecting coil 35. That is, an arbitrary detecting coil may be used from a plurality of first detecting coils around the center of the power transmitting coil 21.

Fourth Embodiment

Figure 6:
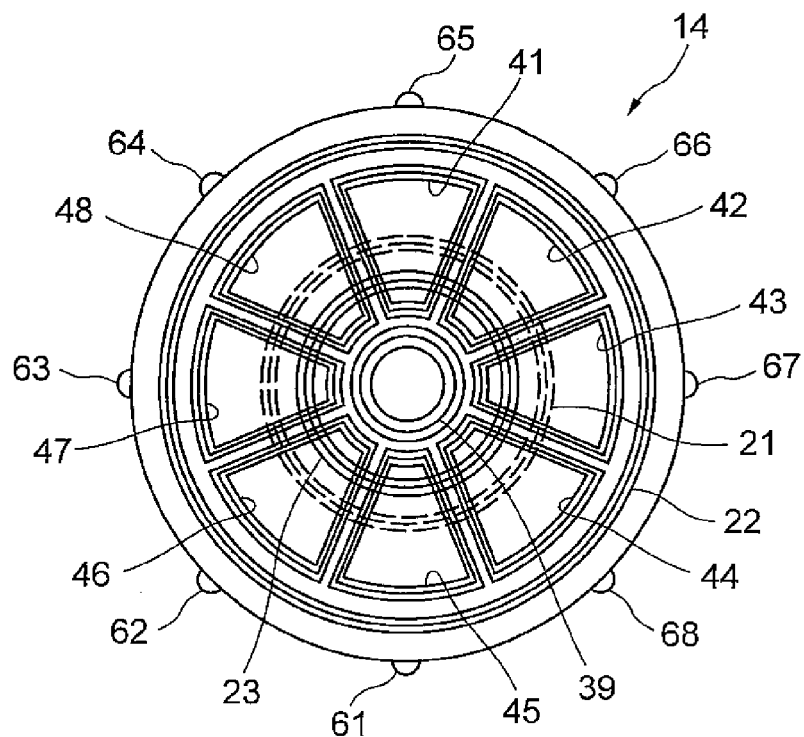
FIG. 6 illustrates a wireless power transmitting device according to a fourth embodiment of the present invention.

Next, FIG. 6 illustrates a wireless power transmitting device according to a fourth embodiment of the present invention. In addition, parts having the same functions as those of the above embodiment will be assigned the same reference numerals, and will not be described. A wireless power transmitting device illustrated in FIG. 6 has a device in which shapes of first detecting coils 31 to 38 according to the above third embodiment are deformed. A wireless power transmitting device 14 has first detecting coils 41 to 48 having a shape with a chamfered angle at which two lines of a fan shape cross. Each of the first detecting coils 41 to 48 is arranged on the same plane as the second detecting coil 39.

A feature of the present embodiment includes that the first detecting coils 41 to 48 and the second detecting coil 39 are arranged without overlapping each other. When each detecting coil is formed as a print coil using a double-sided substrate, it is possible to form the first detecting coils 41 to 48 and the second detecting coil 39 on one substrate surface, and form the first excitation coil and the second excitation coil on the other substrate surface. By this means, it is possible to improve detection sensitivity of an echo signal while making the shape of the second detecting coil 39 smaller.

In addition, the first detecting coils 41 to 48 can also be configured to detect only misalignment in the single direction by, for example, adopting a structure using only the first detecting coil 41 and the first detecting coil 45. That is, an arbitrary detecting coil may be used from a plurality of first detecting coils around the center of the power transmitting coil 21.

Fifth Embodiment

Figure 7:
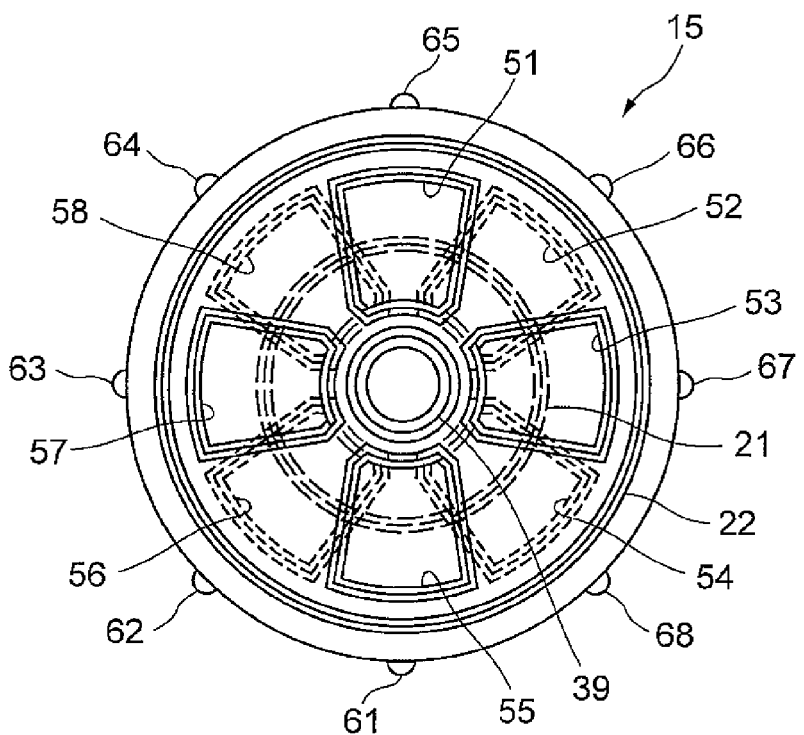
FIG. 7 illustrates a wireless power transmitting device according to a fifth embodiment of the present invention.

Next, FIG. 7 illustrates a wireless power transmitting device according to a fifth embodiment of the present invention. In addition, parts having the same functions as those of the above embodiment will be assigned the same reference numerals, and will not be described. A wireless power transmitting device illustrated in FIG. 7 has a device in which shapes of first detecting coils 31 to 38 according to the above second embodiment are deformed. A wireless power transmitting device 15 has a plurality of first detecting coils 51 to 58 which partially overlap the adjacent first detecting coils mutually. The adjacent first detecting coils 51 to 58 are formed to partially overlap each other. When each detecting coil is formed as a print coil using a double-sided substrate, it is possible to form the first detecting coils 51, 53, 55 and 57 illustrated by solid lines in FIG. 7 on one substrate surface and the first detecting coils 52, 54, 56 and 58 illustrated by dotted lines illustrated in FIG. 7 on the other substrate surface. Further, the first detecting coils 51 to 58 are formed such that an overlapping range increases toward the center of the power transmitting coil. The first detecting coils 51 to 58 and the second detecting coil 39 may be arranged to overlap each other, or may be arranged not to overlap each other.

In the present embodiment, when the power receiving coil is placed near the center of the power transmitting coil 21, an overlapping area of the first detecting coils 51 to 58 and the power receiving coil becomes large. Consequently, it is possible to increase coupling coefficients of the first detecting coils 51 to 58 and the power receiving coil, improve detection sensitivity of an echo signal and realize more precise notification of a misalignment direction. In addition, coupling between overlapping coils becomes strong and detection signals of the detecting coils are more likely to interfere with each other, and therefore the first detection coils 51 to 58 are preferably arranged so as not to overlap the first detecting coils which are not adjacent.

The first detecting coils 51 to 58 have shapes which are symmetrically with respect to the point of the center of the power transmitting coil 21, so that, even when the power receiving coil is placed at any position on the wireless power transmitting device 15, it is possible to increase reliability of directional guidance.

In addition, the first detecting coils 51 to 58 can also be configured to detect only misalignment in the single direction by, for example, adopting a structure using only the first detecting coil 51 and the first detecting coil 55. Thus, an arbitrary first detecting coil around the center of the power transmitting coil 21 may be used.

That is, in the present embodiment, even when the power receiving coil is placed near the center of the power transmitting coil 21, it is possible to improve detection sensitivity of an echo signal and, consequently, a second excitation coil does not need to be provided on an inner side of the first excitation coil 22, when it is necessary to further increase detection sensitivity, the second excitation coil may be provided similar to the third embodiment.

A method of forming the above first excitation coil, second excitation coil, first detecting coils and second detecting coil may be wire-wound coils or print coils directly formed on a circuit substrate. The present invention can be variously modified and implemented in a range which does not deviate from a spirit of the present invention.

The invention claimed is:

1. A wireless power transmitting device comprising:
a power transmitting coil which supplies power to a power receiving coil by way of electromagnetic induction;
a plurality of excitation coils arranged concentrically with the power transmitting coil, the excitation coils having different diameters and exciting the power receiving coil;
a plurality of detecting coils which are arranged around a center of the power transmitting coil; and
a notifying unit, wherein
each of the detecting coils has a shape which widens away from the center of the power transmitting coil, and
the notifying unit notifies relative positions of the power transmitting coil and of the power receiving coil by detecting an echo signal produced in the power receiving coil through the plurality of detecting coils.

2. The wireless power transmitting device according to claim 1, wherein the detecting coils which are adjacent are formed such that the adjacent detecting coils partially overlap each other.

3. The wireless power transmitting device according to claim 2, wherein the adjacent detecting coils are formed such that an overlapping range increases toward the center of the power transmitting coil.

4. The wireless power transmitting device according to claim 1, wherein the detecting coils which are adjacent are arranged to close to each other.

5. The wireless power transmitting device according to claim 1, wherein the plurality of detecting coils comprise a virtually fan shape obtained by dividing a concentric circle, a center of which is a center of the power transmitting coil, and plurality of detecting coils are arranged around the center of the power transmitting coil.

6. The wireless power transmitting device according to claim 1, wherein the plurality of detecting coils are symmetrically arranged around the center of the power transmitting coil.

7. A wireless power transmitting device comprising:
a power transmitting coil which supplies power to a power receiving coil by way of electromagnetic induction;
a plurality of excitation coils arranged concentrically with the power transmitting coil, the excitation coils having different diameters and exciting the power receiving coil;
a plurality of first detecting coils which are arranged around a center of the power transmitting coil;
a second detecting coil; and
a notifying unit, wherein
each of the first detecting coils has a shape which widens away from the center of the power transmitting coil,
the second detecting coil comprises a virtually circular shape which is arranged virtually concentrically with the power transmitting coil, and
the notifying unit notifies relative positions of the power transmitting coil and the power receiving coil by detecting an echo signal produced in the power receiving coil through the plurality of first detecting coils and the second detecting coil.

8. The wireless power transmitting device according to claim 7, wherein the first detecting coils which are adjacent are formed such that the adjacent first detecting coils partially overlap each other.

9. The wireless power transmitting device according to claim 8, wherein the adjacent first detecting coils are formed such that an overlapping range increases toward the center of the power transmitting coil.

10. The wireless power transmitting device according to claim 7, wherein the first detecting coils which are adjacent are arranged to close to each other.

11. The wireless power transmitting device according to claim 7, wherein the plurality of first detecting coils comprise a virtually fan shape obtained by dividing a concentric circle, a center of which is a center of the power transmitting coil, and plurality of first detecting coils are arranged around the center of the power transmitting coil.

12. The wireless power transmitting device according to claim 7, wherein the plurality of first detecting coils are symmetrically arranged around the center of the power transmitting coil.

* * * * *